United States Patent [19]
Langlois

[11] 3,889,541
[45] June 17, 1975

[54] BALANCE APPARATUS

[75] Inventor: Christian Langlois, Billancourt, France

[73] Assignee: Regie Nationale des Usines Renault, Billancourt, France

[22] Filed: May 18, 1973

[21] Appl. No.: 361,438

[30] Foreign Application Priority Data
June 1, 1972 France .................. 72.19778

[52] U.S. Cl. ............................... 73/460; 73/40
[51] Int. Cl. ...................... G01m 1/20; G01m 1/16
[58] Field of Search .............. 73/460, 462–467, 73/468, 470, 487

[56] References Cited
FOREIGN PATENTS OR APPLICATIONS
| | | | |
|---|---|---|---|
| 488,936 | 1/1930 | Germany | 73/468 |
| 461,387 | 2/1937 | United Kingdom | 73/468 |
| 280,380 | 11/1927 | United Kingdom | 73/468 |
| 506,427 | 9/1930 | Germany | 468/ |

*Primary Examiner*—James J. Gill
*Attorney, Agent, or Firm*—Stevens, Davis, Miller & Mosher

[57] ABSTRACT

Apparatus for dynamically measuring the want of balance of a rotating workpiece, characterised in that it comprises a shaft parallel to the axis of rotation of said workpiece, said shaft carrying a pair of inertia weights providing a predetermined want of balance, which are spaced from each other, and a reference mark for locating the direction of the want of balance, a member capable of revolving about said axis and to be rigidly connected to said workpiece mounted for rotation about said axis, and means for rotating said shaft and said workpiece at the same angular velocity. (FIG. 1).

9 Claims, 7 Drawing Figures

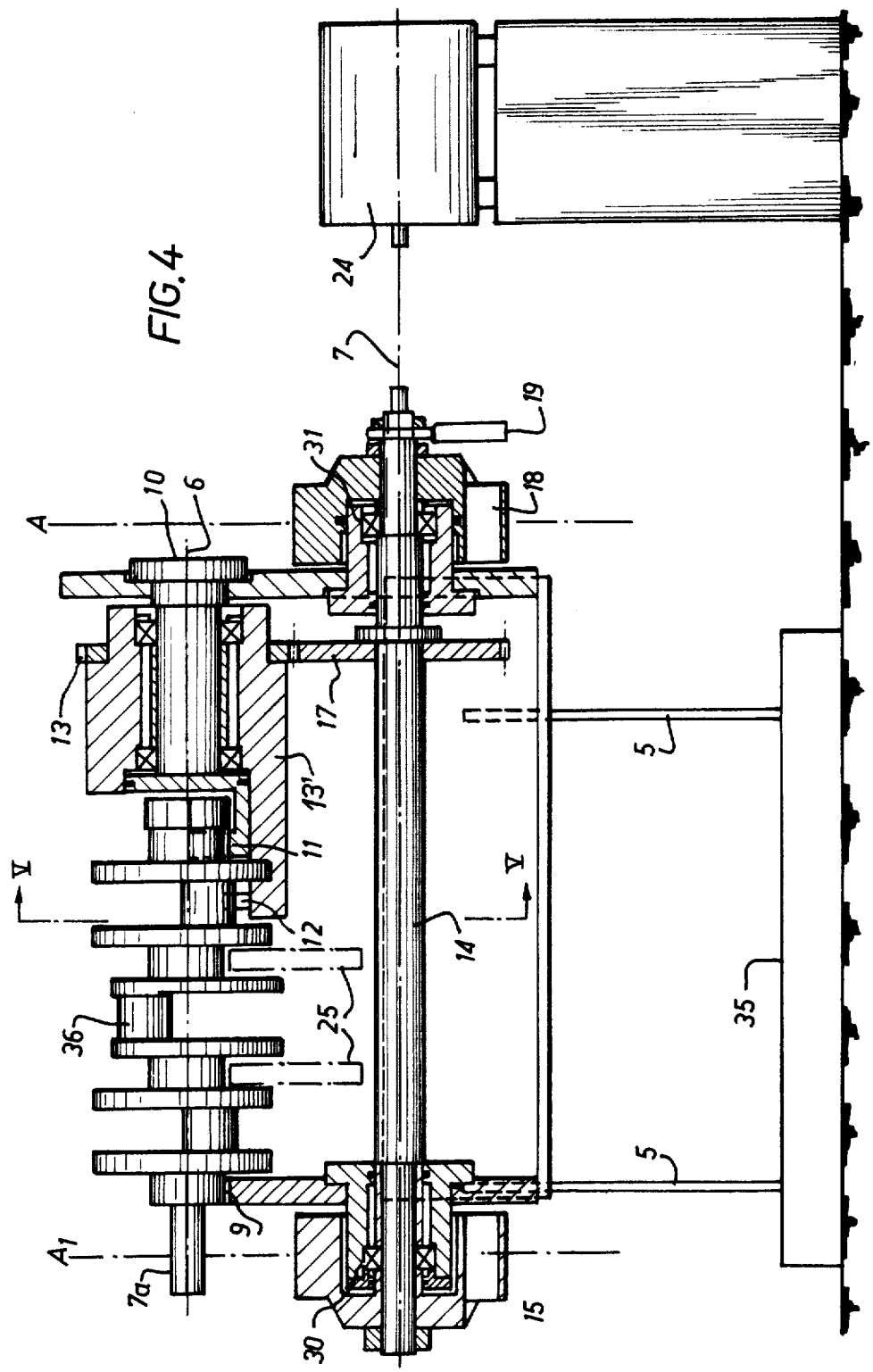

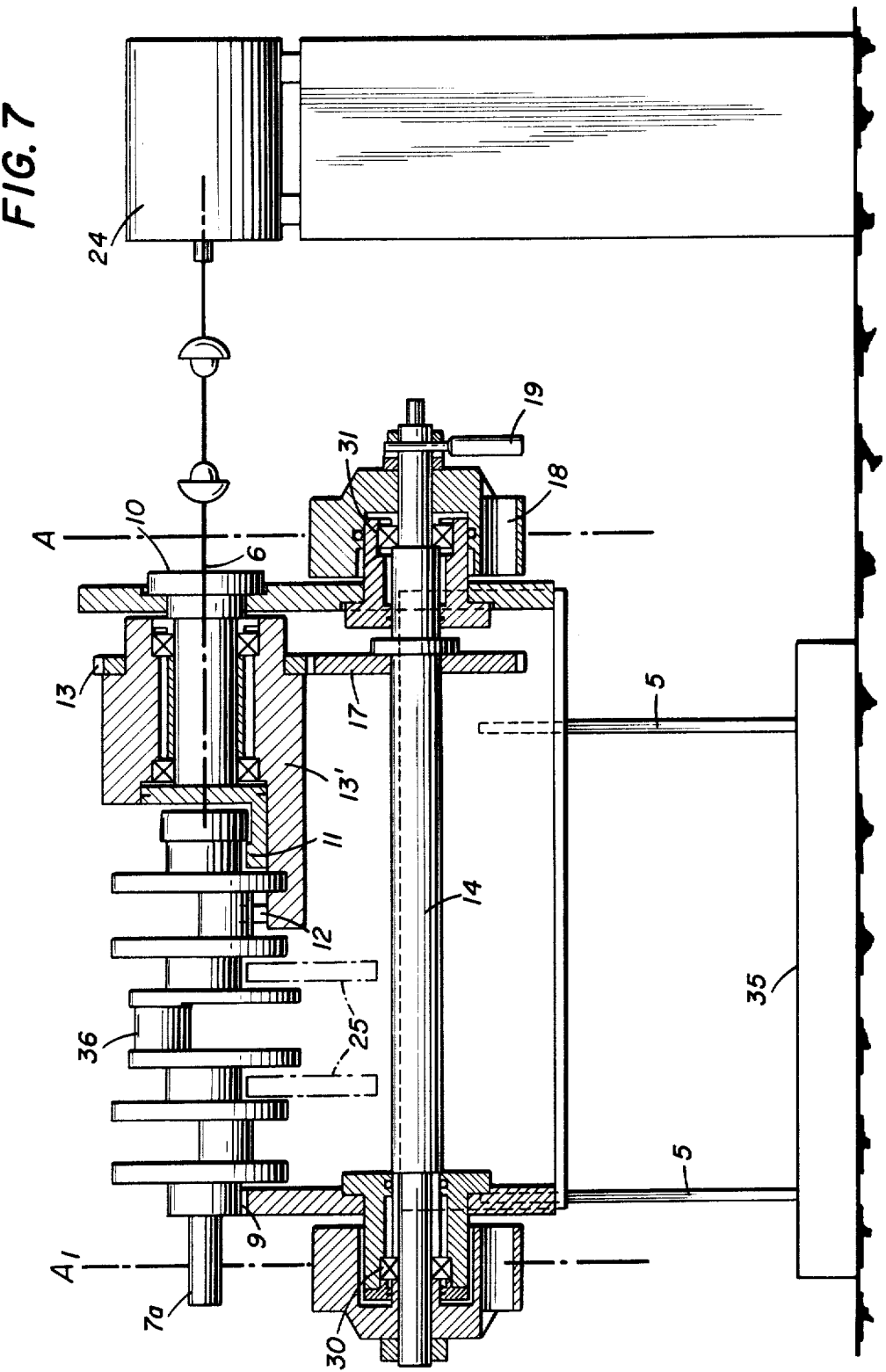

BALANCE APPARATUS

The present invention relates to an apparatus for comparing the dynamic want of balance of a member having an axis of rotation about which it can rotate to a reference dynamic want of balance. This apparatus comprises in a known manner a fixed base, vertical flexible elements carried by said base, a frame supported by said flexible elements and provided with other elements providing an axis of rotation, said other elements being capable of causing the axis of rotation of the rotating member mounted in the apparatus to become coincident with the axis of said frame, means for rotating said member, and sensing means for measuring the characteristics of the horizontal movement of the frame during the rotation of said member.

An apparatus of this character is already known which comprises a cradle-shaped assembly for rotating the member, said assembly being mounted in said frame coaxially to the axis of rotation of said rotating member, and carrying at either ends inertia weights the want of balance of which constitutes the reference want of balance. This apparatus is objectionable in that it is not possible to dispose transfer bars under the rotating member for facilitating the easy and rapid positioning of this member in the machine with a view to determine its want of balance, and subsequently removing the member after the examination.

With the apparatus according to the present invention this inconvenience is avoided. This apparatus is characterised essentially by the presence, on said frame, of a shaft parallel to the axis of rotation of the member to be tested, said member and shaft being driven jointly for rotation at the same angular velocity, in the same direction or in opposite direction. Due to the transfer of the pair of inertia weight for simulating the residual want of balance, of the other inertia weights for compensating the want of balance of the members, of the standing balance cam, of the phase reference instruments, to this shaft, the berth provided for the member or part to be tested is cleared and facilitates greatly the service operations.

The apparatus according to this invention is intended for comparing the dynamic want of balance for example of each one of a plurality of identical (except for machining or other manufacturing tolerances or differences) workpieces to the dynamic want of balance of the shaft supporting said inertia weights, in order to measure the discrepancy between the want of balance of each workpiece and the residual reference want of balance.

The dynamic want of balance of a workpiece having an axis of rotation about which it is rotated can under all circumstances be reduced to two wants of balance lying in two separate planes perpendicular to said axis. The workpiece carries a reference mark and its want of balance is directed in relation thereto. The workpiece mounted in the apparatus is properly directed in relation to the shaft by means of the reference marks carried by said shaft and on said workpiece. Considering two vertical planes perpendicular to said shaft and to the axis of rotation, and intersecting said pair of inertia weights, respectively, these inertia weights may be so determined and adjusted that, in each one of said two planes, their want-of-balance vector and the residual want-of-balance vector of the reference workpiece have the same module and be (simultaneously) in opposition when they are parallel to the plane of permissible movement of the movable frame, which takes place twice in a revolution. As the reference workpiece is replaced by a test workpiece, only the difference between the projections of the wants of balance on the plane of the beat movements of the frame will be detected by the movement sensors.

As in the above-mentioned known apparatus the rotating workpiece may consist more particularly of a crankshaft without its connecting-rods, and the inertia weights having the same want of balance as that provided by the connecting-rods constitute means for simulating the want of balance of the connecting-rods. Under these conditions, the apparatus permits of comparing the crankshaft want of balance with that of said simulating inertia weights, i.e. also of the connecting-rods. The two wants of balance must balance each other in order to free the crankshaft and connecting-rod assembly of any want of balance. According to the result of this comparison, material is substracted from or added to suitable locations of the crankshaft, then the thus treated crankshaft is re-examined, and treated again if the difference between its want of balance and that of said simulating inertia weights exceeds the predetermined tolerance limit.

Now the present invention will be described in detail with reference to the attached drawings illustrating diagrammatically two typical forms of embodiment of the invention, wherein the rotating body or workpiece is a crankshaft. In the drawings:

FIG. 4 is an elevational section showing the second form of embodiment of the invention, wherein the shaft supporting the inertia weights and the crankshaft rotate about the frame axis revolve in opposite directions;

FIG. 7 is an elevational view showing the drive through the workpiece.

Figure 1:
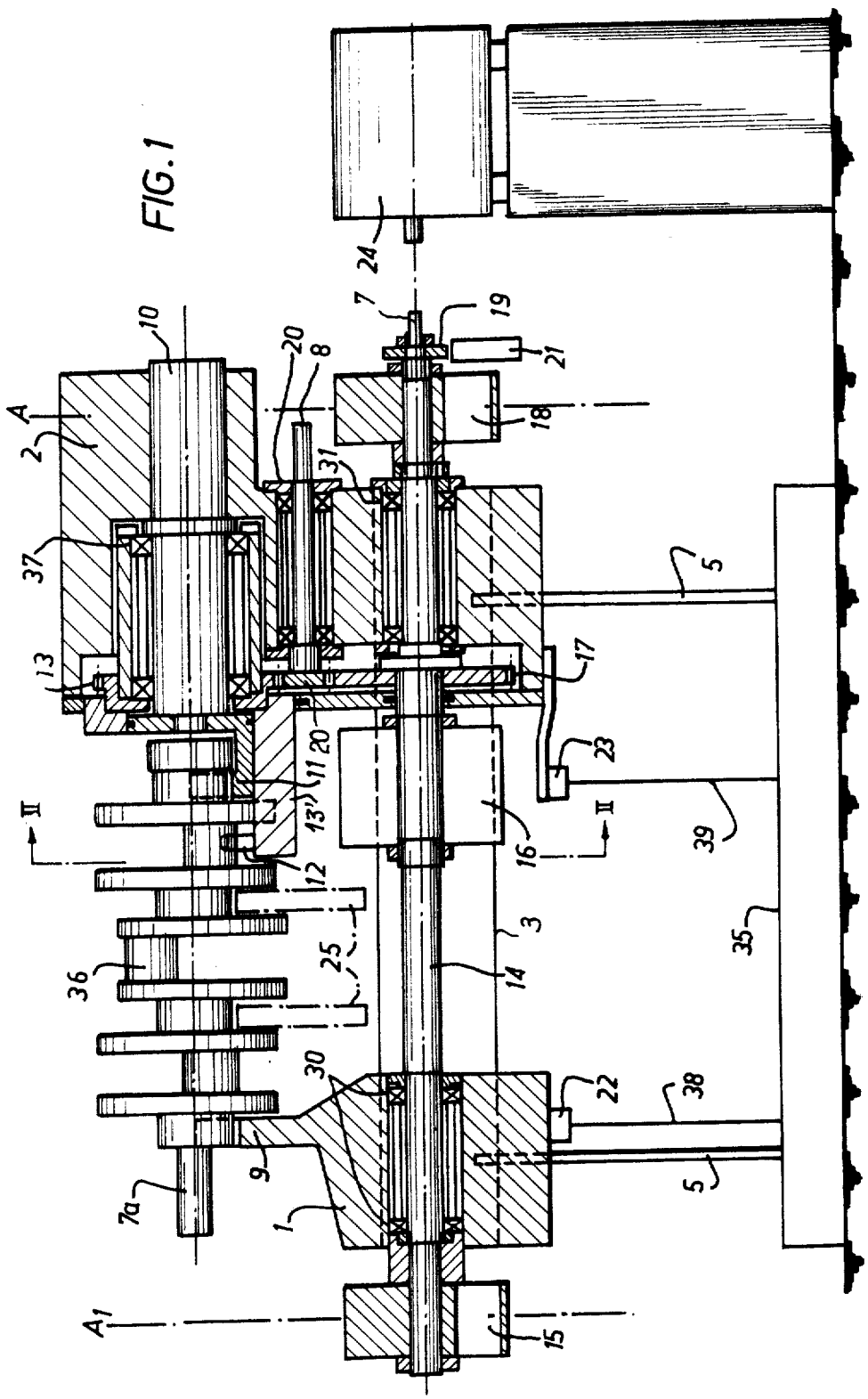
FIG. 1 is a diagrammatic elevational section of the first form of embodiment wherein the shaft carrying the inertia weights and a crankshaft revolving about the frame axis rotate in the same direction.
Figure 2:
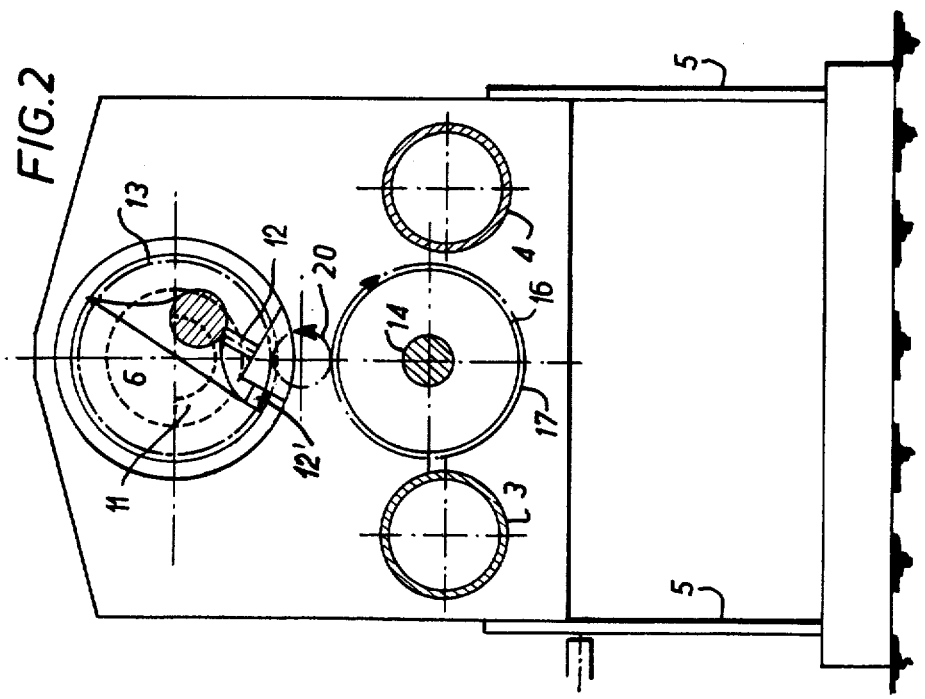
FIG. 2 is a view taken in the direction of the arrows II—II taken from the left-hand end of FIG. 1, showing the apparatus of this figure.

As shown in FIGS. 1 and 2, a rigid base structure 35 carries four vertical flexible rods 5 supporting in turn a rigid frame or like structure comprising a pair of flanges 1 and 2 interconnected by a pair of parallel horizontal tubes 3 and 4.

A lower horizontal shaft 14 is journalled in flanges 1 and 2 by means of a pair of bearings 30 (in flange 1) and another pair of bearings 31 (in flange 2), and carries in the left-to-right direction as seen in FIG. 1 the following component elements rotatably fastened to said shaft by means permitting an accurate angular adjustment: a first want-of-balance inertia weight 15, a compensation inertia weight 16, a toothed wheel 17, a second want-of-balance inertia weight 18, a reference plate 19. The axis of shaft 14 is designated by the reference numeral 7 and the shaft has graduations on it to accurately position the weights. The pair of inertia weights 15 and 18 simulate the want-of-balance of the connecting-rod system (not shown) to be mounted on the crankshaft as will be explained presently, this mounting being of course part of the engine assembling operation.

The flange 1 carries a bearing comprising a half-bearing shell 9, and the other flange 2 carries a bearing consisting of another half-bearing shell 11 and a horizontal cylindrical bar 10. The horizontal axes of the pair of half-bearings 9 and 11, on the one hand, and of the cylindrical bar 10, on the other hand, are strictly aligned with each other and parallel to the lower axis 7. A crankshaft 36 is supported by said half-bearing shells 9 and 11, and rotatably driven from a toothed wheel 13 mounted in a bearing 37. This wheel 13 carries an axial horizontal arm 13' provided with a pair of driving studs, namely a stud 12 engaging a crankpin and another stud 12' engaging a crankshaft balance weight. Therefore, this crankshaft 36 is rotatably solid with the wheel 13 having the same number of teeth as the aforesaid toothed wheel 17.

A lay shaft 8 carries an intermediate pinion 20 in constant meshing engagement with said toothed wheels 13 and 17, so that shaft 14 and stud 12 revolve in the same direction and at the same angular velocity.

A position sensor 21 rigid with the frame permits of setting the crankshaft 36 in the inoperative condition of the apparatus. The frame oscillation sensors 22 and 23 are rigidly connected through coupling means shown only diagrammatically at 38 and 39 to the base structure 35. A drive motor 24 is operatively connected to shaft 14 via a set of Universal couplings (not shown). A transfer member 25 extends between shaft 14 and crankshaft 36 and is movable at right angles thereto. The function of this transfer member is to permit the easy and quick positioning and removal of the crankshafts to be examined in succession.

Figure 3:
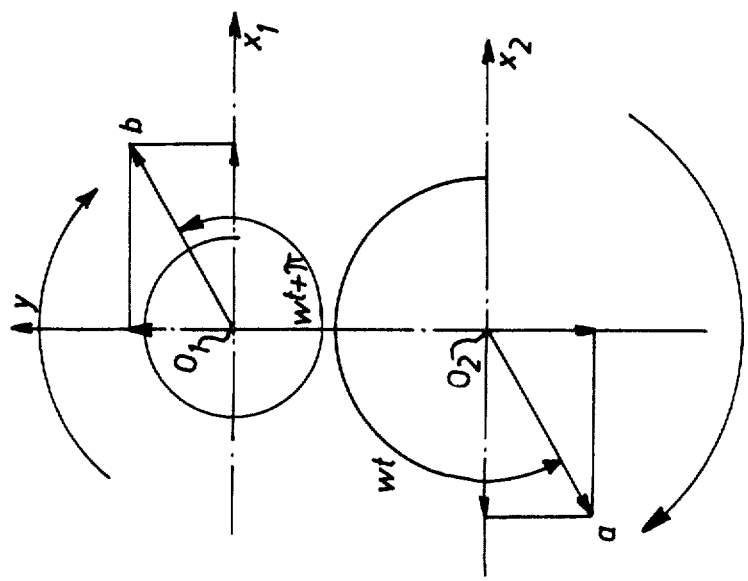
FIG. 3 is a vectorial illustration of the dynamic wants of balance in the transverse vertical plane A of FIG. 1.

The two vertical planes A and A1 pass through the centres of gravity of the pair of inertia weights 18 and 15, respectively, and constitute the two planes mentioned hereinabove, into which the wants of balance are brought back. FIG. 3 is contained in plane A. Vector $b$ designates the want of balance inherent to the reference crankshaft 36, without its connecting-rods, and vector $a$ designates the want of balance of the connecting-rod simulating inertia weight 18. In FIG. 3 it is assumed that these vectors $a$ and $b$ are at a given moment of equal values and in phase opposition. They remain constantly so during the rotation of shaft 14 and crankshaft 36, the horizontal components of the two vectors following the horizontal axes $O_1x_2$ and $O_2x_2$, and likewise their vertical components following the common vertical axis $O_2O_1y$ cancel each other, so that there remains only a couple due to the fact that the wants of balance $a$ and $b$ do not rotate about the same axis, this causing the rods 5 to be subjected to alternate tractive and compressive efforts. Assuming that the conditions are the same in plane A1, the assembly comprising the shaft 14 and inertia weights 18 and 15, and also the crankshaft 36, is balanced, and sensors 22 and 23 will not sense any horizontal movement of the frame.

In operation, when the various crankshafts of a mass-production cycle are examined successively, their wants-of-balance depart more or less from that of shaft 14 with its two inertia weights, and sensors 22 and 23 detect only the frame movements which differ from one crankshaft to another. From these movements the treatment to be applied to the crankshaft are derived according to a well-known method, by adding or substracting material to or from the workpiece at two properly selected locations in order to balance the shaft 14 supporting the inertia-weights, i.e. with its connecting-rod assembly.

Of course, various modifications may be brought in the practical embodiment of the apparatus illustrated in FIGS. 1 and 2. Some of these modifications are briefly mentioned hereinafter:

Thus, each half-bearing shell 9, 11 is replaced by a set of rollers. At least one of these two sets of rollers is then driven directly and adapted to drive the pinion 20 and shaft 14 via crankshaft 36 and stud 12.

The shaft 14 is driven from the end 7a of crankshaft 36 which is opposite to stud 12 and via this stud 12 and pinions 13, 20 and 17.

The journal bearings 9 and 11 are replaced by a point and a tailstock as in a lathe.

The single lay-shaft 8 carrying a toothed wheel 20 is replaced by an odd number of shafts each supporting a toothed wheel meshing with the other two, the assembly of toothed wheels (each wheel having a proper diameter), constituting a transmission system.

If desired, a chain transmission or a slipless-belt transmission may be substituted for the toothed wheels.

Figure 5:
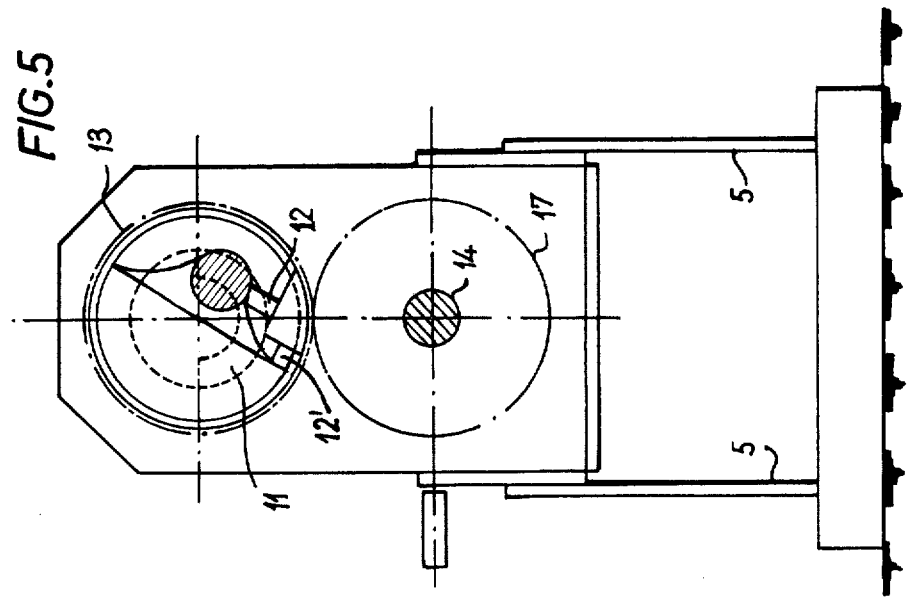
FIG. 5 is a view taken along the line V—V as seen from the left-hand portion of FIG. 4, of the apparatus of this last figure.

In FIGS. 4 and 5, the component elements of the device shown in FIGS. 1 and 2 which have the same functions are designated by the same reference numerals. The arrangement of FIGS. 4 and 5 differs however from that of FIGS. 1 and 2 essentially in that the lay shaft 8 and its toothed wheel 20 are dispensed with and that the toothed wheel 17 of shaft 14 are in direct meshing engagement with toothed wheel 13 rigid with driving stud 12, so that the shaft 14 and crankshaft 36 rotate in opposite directions. The inertia weights 15 and 18 are disposed above the pair of bearings 30 and 31, to prevent the shaft 14 from sagging.

Figure 6:
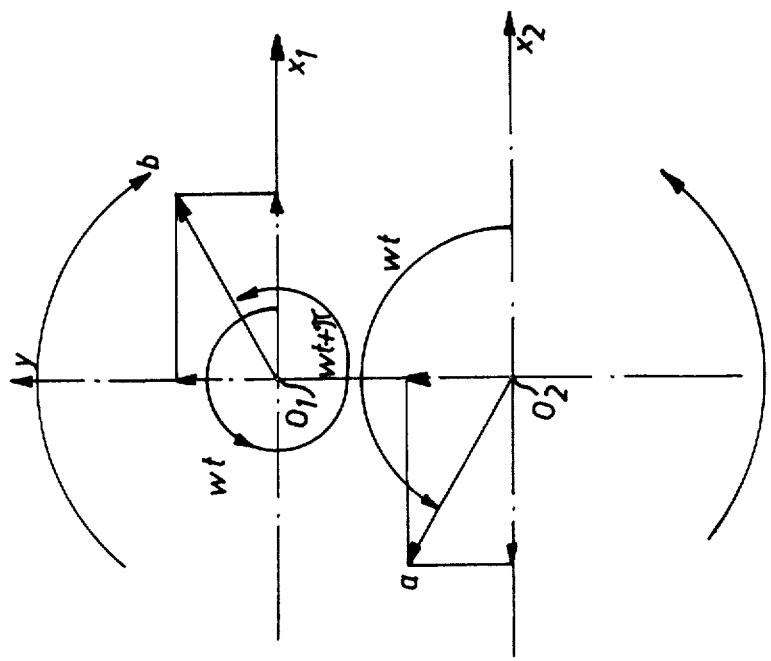
FIG. 6 is a vectorial illustration of the dynamic wants of balance in the plane A of FIG. 4.

In FIG. 6 it is assumed that both vectors $a$ and $b$ having the same meaning as in FIG. 3 have the same module and form with the horizontal axes $O_2x_2$ and $O_1x_1$ the angles denoted $wt$ and $-wt + \pi$, respectively. These two vectors illustrating the two wants of balance respectively are then in phase opposition when they pass simultaneously, twice per revolution, through the horizontal plane, and the horizontal components of the two wants of balance constantly cancel each other. The vertical components on axis $O_2O_1y$ add themselves to each other, but their only consequence is to add themselves to the couple mentioned hereinabove which already exists in the case of FIG. 3, said couple causing the rods 5 to be alternatively tension and compression stressed.

It will be seen that most of the modifications, mentioned hereinabove, that may be brought to the apparatus illustrated in FIGS. 1 and 2 may also be brought to the apparatus illustrated in FIGS. 4 and 5. However, the following modifications may also be contemplated, in addition to those mentioned in the foregoing:

The bearings 30 and 31 are swivel bearings, adapted to accomodate a moderate misalignment between their bores.

In this case, when the discrepancy between bearings 9 and 11 can be made to equal that observed between bearings 30 and 31, the connection between flanges 1 and 2 is eliminated, and the one-piece oscillating frame is replaced by two members oscillating separately.

A third bearing is mounted on shaft 14 and a third inertia weight is wedged just above this bearing.

Although, specific forms of embodiment of this invention have been described hereinabove and illustrated in the accompanying drawing, it will readily occur to those skilled in the art that various modifications and changes may be brought thereto without departing from the scope of the invention as set forth in the appended claims.

What I claim is:

1. An apparatus for comparing the dynamic want of balance of a workpiece having an axis of rotation about which it can rotate to a dynamic reference want of balance and for dynamically balancing rotating workpieces of which it is desired to preserve a given residual want of balance comprising,
   a fixed base;
   at least two vertical flexible elements extending from said base;
   a frame supported by said flexible elements;
   means on said frame defining a first reference axis having a shaft rotatably mounted on said frame;
   a pair of want-of-balance inertia weights spaced from each other on said shaft to create a moment equal to the desired residual want-of-balance and graduations on said shaft to accurately position said weights;
   workpiece holding means on said frame defining a second axis of rotation parallel to said shaft capable of rotating a rotary workpiece with its axis of rotation coincident with said second axis of rotation;
   a member rotating about said second axis and capable of fastening to said rotating workpiece for rotation of said workpiece;
   means for rotating said shaft and said workpiece at the same angular velocity; and
   sensor means for measuring the characteristics of the horizontal movement of said frame during said workpiece rotation.

2. Apparatus as set forth in claim 1, wherein said means for rotating said shaft and said workpiece are adapted to rotate said shaft and workpiece in the same direction.

3. Apparatus as set forth in claim 1, wherein said means for rotating said shaft and said workpiece are adapted to rotate said shaft and workpiece in opposite directions.

4. Apparatus as set forth in claim 1, wherein the frame elements determining said second axis of rotation have a sufficient relative spacing in the horizontal direction, and are disposed at a level other than that of said shaft, to permit the introduction, by means of a movement perpendicular to said shaft, a transfer member capable of gripping the workpiece from beneath and then shifting said workpiece horizontally.

5. Apparatus as set forth in claim 1, wherein said inertia weights are mounted just around bearings for said shaft.

6. Apparatus as set forth in claim 1 for balancing dynamically rotating bodies, notably workpieces, which are to preserve a predetermined residual want of balance, wherein said driving means between the workpiece to be balanced and the shaft carrying said inertia weights consist of toothed wheels, a first toothed wheel having its axis coincident with that of the workpiece to be balanced and being rotatably driven from said workpiece through a driving member having an angular reference mark fixed in relation to the workpiece and to said toothed wheel, which drives in turn another toothed wheel rigid with said inertia-weight supporting shaft through at least one toothed wheel such that the desired direction of rotation of the inertia-weight supporting shaft be obtained.

7. Apparatus as set forth in claim 6, wherein said rotary driving means are adapted to drive directly the workpiece which drives in turn said inertia-weight carrying shaft via a driving member and said transmission.

8. Apparatus as set forth in claim 1, wherein said means for rotatably driving the workpiece are also capable of driving in parallel the element driving said workpiece and said inertia-weight carrying shaft.

9. Apparatus as set forth in claim 1, wherein said shaft is rotatably mounted on said frame by means of a pair of swivel bearings.

* * * * *